June 28, 1966  J. A. WALLING ETAL  3,258,524
MOVABLE ELECTRICAL INSULATING BUSHING
Filed May 7, 1964  5 Sheets-Sheet 1

WITNESSES:
John L. Chopp
James F. Young

INVENTORS
John A. Walling and
Howard M. Donegan
BY
Donald P. Lackey
ATTORNEY

June 28, 1966     J. A. WALLING ETAL     3,258,524
MOVABLE ELECTRICAL INSULATING BUSHING
Filed May 7, 1964     5 Sheets-Sheet 4

United States Patent Office 3,258,524
Patented June 28, 1966

3,258,524
MOVABLE ELECTRICAL INSULATING BUSHING
John A. Walling, Muncie, and Howard M. Donegan, Center Township, Muncie, Ind., assignors to Westinghouse Electric Corporation, Pittsburgh, Pa., a corporation of Pennsylvania
Filed May 7, 1964, Ser. No. 365,666
6 Claims. (Cl. 174—161)

This invention relates in general to electrical apparatus and more particularly to movable mounting means for electrical insulating bushings used with electrical apparatus.

Electrical apparatus, such as transformers, designed for transit over highways, must be designed within the space limitations set by the Interstate Commerce Commission, the State, or by temporary permit. For example, portable or mobile substations, which generally include a transformer and associated switching and protective devices mounted on a movable carriage or vehicle, must not exceed predetermined widths and heights. Serious design problems are encountered when the BIL (basic impulse insulation level) of the transformer is increased, as a point is reached where the electrical clearance required between the electrical terminals at the ends of the electrical insulating bushings is greater than the highway width or height limitations. Thus, it is necessary to design the equipment mounted on the vehicle such that the electrical and mechanical clearances may be decreased during the transporting time, and quickly and easily increased after the vehicle has been moved over the highways to the operating location. Various means have been employed, such as removing the electrical bushings during transit, or rotating the bushing, with the bushing being mounted obliquely with respect to the casing so that the outer ends of the bushings move toward each other, to thus decrease the distance between the outer ends of the bushings to within the space limitation. These methods, however, have certain disadvantages. If the bushings are removed, it is not only difficult to replace them in the field because of their weight and size, but the problem of preventing contamination of the liquid dielectric in the transformer casing is created. If the bushings are rotated, a complex mechanical and sealing arrangement is required, which is expensive to construct and in time may wear and allow the seal to be broken.

Accordingly, it is an object of this invention to provide new and improved movable mounting means for electrical insulating bushings.

Another object of the invention is to provide a new and improved movable mounting means for electrical insulating bushings in which the sealing gaskets and contacting surfaces are stationary.

A further object of this invention is to provide a new and improved movable mounting means for disposing electrical insulating bushings through the casing of electrical apparatus which allows the electrical clearance between the outer ends of the electrical insulating bushings and overall dimensions of the electrical apparatus to be changed without rotation of the bushings.

Another object of the invention is to provide a new and improved movable mounting means for disposing electrical insulating bushings through the casing of electrical apparatus which allows the electrical clearance between the outer ends of the bushings to be changed without breaking the seal between the bushing and the casing.

Still another object of the invention is to provide a new and improved mobile electrical apparatus which allows the mechanical and electrical clearances of the electrical insulating bushings to be quickly and easily changed from a "transporting" to an "operating" position without rotation of the bushings and without breaking the seal of the electrical apparatus.

Briefly, the present invention accomplishes the above-cited objects by providing new and improved mounting or supporting means for electrical insulating bushings which operate upon the principle of pivotally moving the bushing within a predetermined angle of travel. An expansion joint assembly, including a flexible bellows portion, allows movement of the bushing without relative movement between any of the sealed surfaces.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
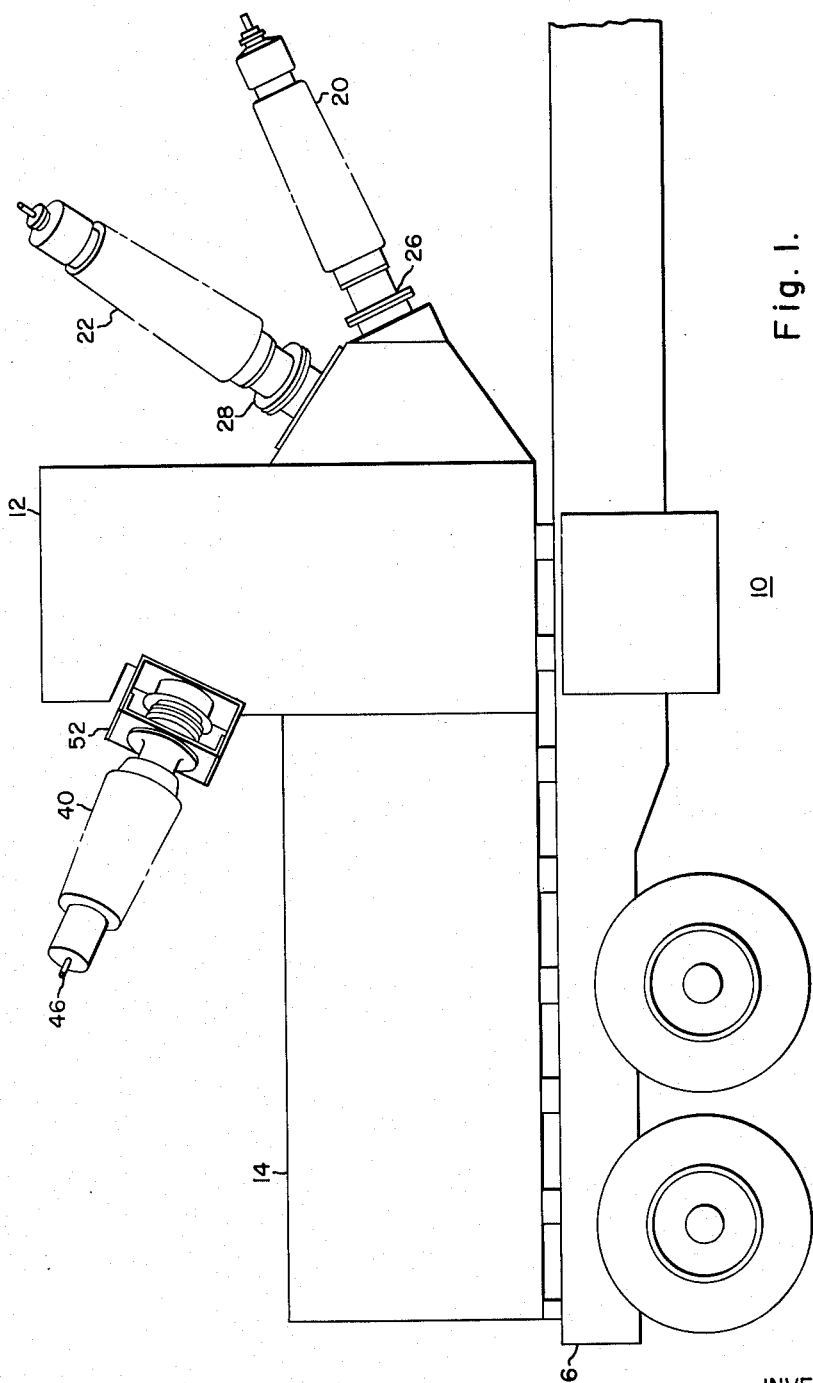
FIGURE 1 shows a side elevation of mobile electrical apparatus embodying the principles of the invention.
Figure 2:
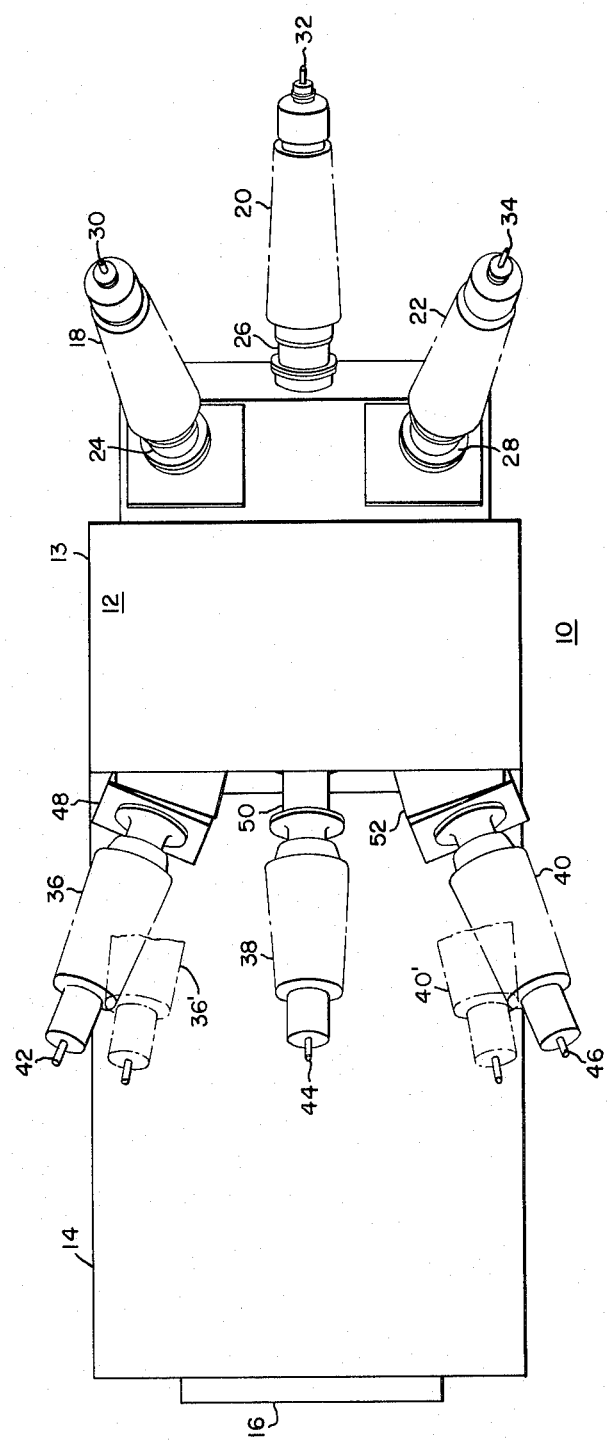
FIG. 2 shows a plan view of the mobile electrical apparatus illustrated in FIG. 1, illustrating the "transporting" and "operating" positions of the electrical insulating bushings.

Referring now to the drawings, in which like components are given like reference numerals in the various views, there is shown in FIGS. 1 and 2 mobile electrical apparatus 10, such as a mobile substation, including an electrical transformer 12 and associated switching and protective apparatus 14 disposed upon the carriage or bed 16 of a tractor trailer. Transformer 12 includes electrical insulating bushings 18, 20 and 22, rigidly attached to the casing 13 of transformer 12 by conventional bushing bosses 24, 26 and 28, respectively, which also seal the openings in the casing 13 of the transformer 12 against contaminants. Bushings 18, 20 and 22 are disposed on the casing 13 in an oblique manner with respect to the casing 13, in order to obtain the desired electrical clearance between electrical terminals 30, 32 and 34.

In the particular mobile substation illustrated in FIGS. 1 and 2, bushings 18, 20 and 22 are utilized for the entrance of electrical conductors into the casing 13 of transformer 12 for connection to the primary windings (not shown). The design of the transformer 12 and mobile substation 10 allowed room for bushing 20 to be located on a lower plane than bushings 18 and 22, thus allowing the desired electrical clearance between terminals 30, 32 and 34, while still maintaining the bushings 18, 20 and 22 within the highway space limitations.

Transformer 12 also includes electrical insulating bushings 36, 38 and 40, for allowing the electrical connections to the secondary windings of transformer 12 to be brought through the casing 13 of transformer 12. Bushings 36, 38 and 40 are also disposed in an oblique manner on the casing of transformer 12, in order to obtain the desired electrical clearance between electrical terminals 42, 44 and 46, respectively. Bushings 36, 38 and 40 are attached to the casing 13 by mounting and sealing means 48, 50 and 52, respectively. The design of transformers 12, plus the fact that space requirements made it necessary that bushings 36, 38 and 40 lie in the same plane, resulted in the dimension between terminals 42 and 46 of bushings 36 and 40, respectively, being greater than highway limitations for vehicle width. This problem may be quickly and easily solved by utilizing the teachings of this invention, without breaking the transformer seal, and without rotation of the bushings. The invention allows bushings 36 and 40 to be moved from an "operating" position to a "transporting" position, with the latter being shown in phantom. Reference numerals 36' and 40' indicate bushings 36 and 40 in the transporting position, with the bushings 36 and 40 in the transporting position being within the extremities of the transporting vehicle 16 and associated apparatus 14. Thus, during the time the mobile substation 10 is being moved from one location to another, bushings 36 and 40 are disposed in the positions indicated by reference numerals 36' and 40'. Once the operating location has been reached, bushings 36 and 40 are returned to their extreme or operating positions, producing the desired electrical clearances between electrical terminals 42, 44 and 46.

In order to change the bushings 36 and 40 from one position to the other, bushing support means 48 and 52 are made movable. Since bushing support means 48 and 52 are similar in construction and operation, only the bushing support or mounting means 52 and its associated bushing will be described in detail.

Figure 3:
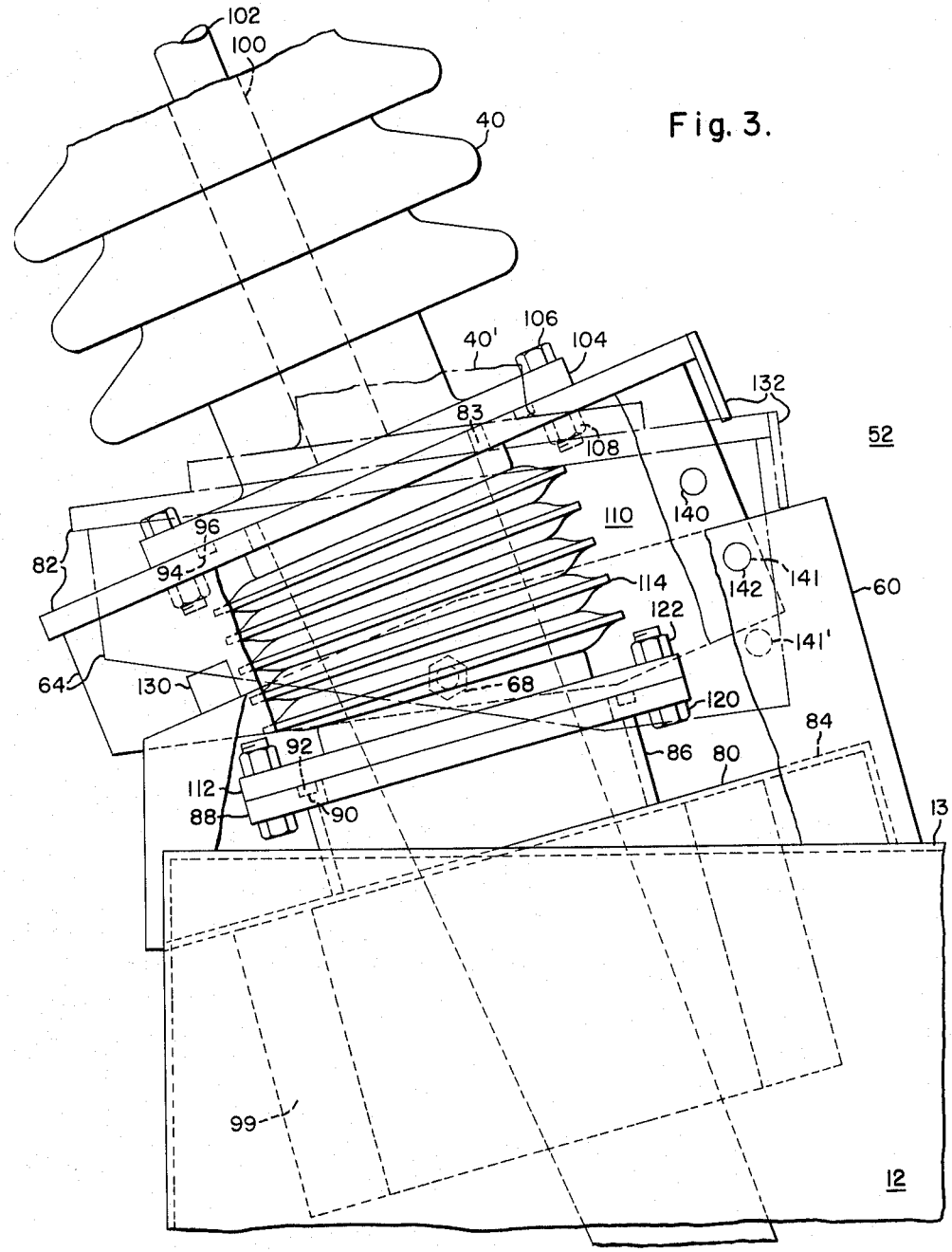
FIG. 3 shows a side elevation of movable mounting means for electrical insulating bushings constructed according to the teachings of this invention.
Figure 4:
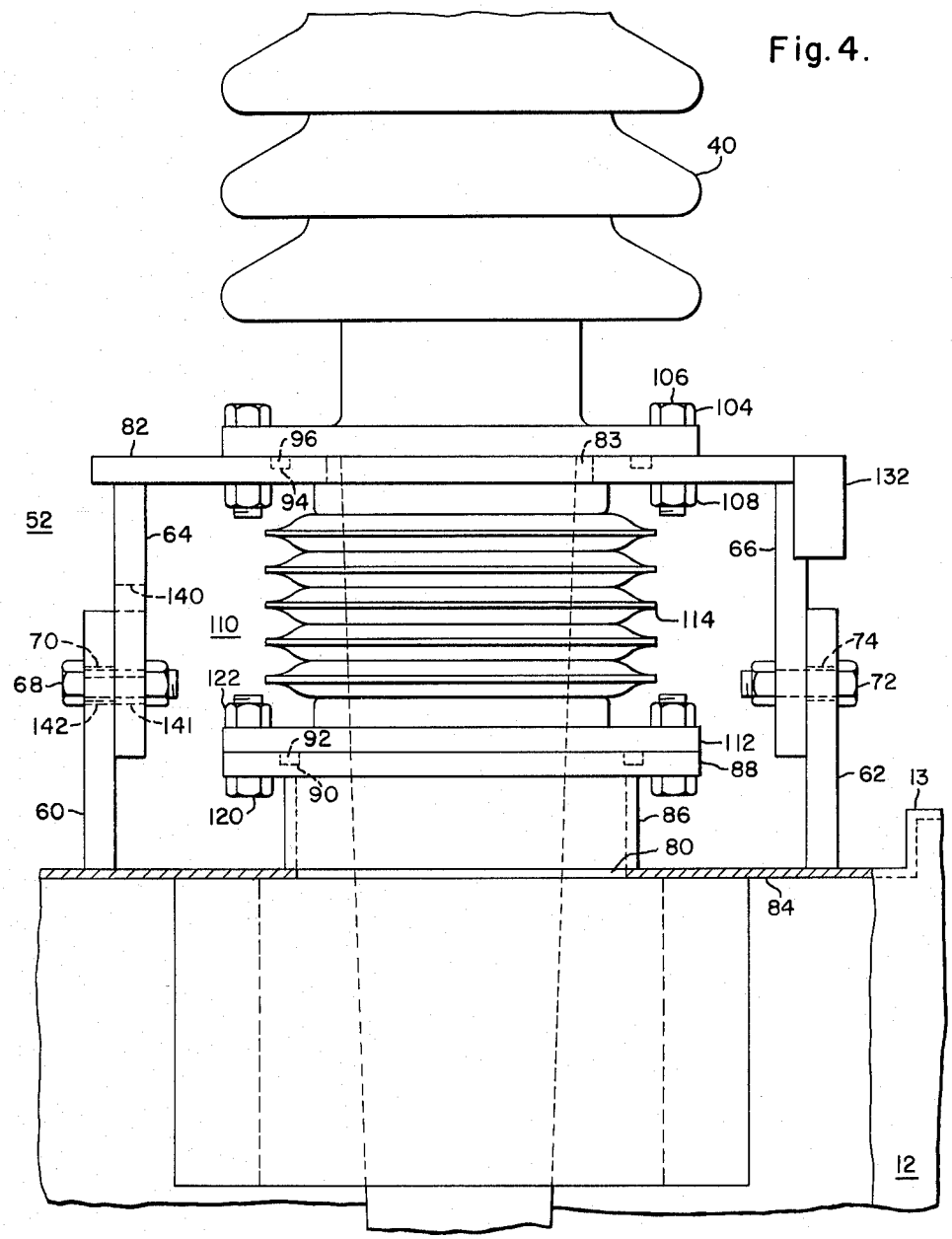
FIG. 4 shows an end view of the movable mounting means illustrated in FIG. 3.

FIGS. 3 and 4 show movable mounting means 52 and electrical insulating bushing 40 in detail, with FIGS. 3 and 4 being side and end elevations of bushing mounting means 52, respectively.

Basically, movable mounting means 52 comprises a pair of stationary flange members 60 and 62 affixed to and projecting outwardly from casing 13, as best shown in FIG. 4, and a pair of movable flange members 64 and 66. Movable flange member 64 is pivotally associated with stationary flange member 60 by fastening means 68, such as a nut and bolt arrangement, and a bearing 70 may be provided to allow flange member 64 to pivot freely, even when a substantial weight is applied to flange member 64. In like manner, movable flange member 66 is pivotally associated with stationary flange member 62 by fastening means 72, and a bearing 74.

Stationary flange members 60 and 62 are attached in spaced parallel relation to the casing 13 of transformer 12 by welding, or any other suitable fastening means. An aperture or opening 80, for entrance of bushing 40 into casing 13 of transformer 12, is centrally located between the stationary flange members 60 and 62. A bridging or plate member 82 having an opening 83 therein, is suitably attached, by welding or other means, to the movable flange members 64 and 66, such that flange members 64 and 66 and bridging member 82 may pivot as one integral assembly on fastening means 68 and 72 and bearings 70 and 74. The openings 80 and 83 are arranged in substantial alignment or registry, for purposes which will be hereinafter described.

In order to provide a support for a current tansformer 99 and give the desired angle of inclination of bushing 40 with respect to casing 13, casing 13 may have a projecting portion 84, as best shown in FIG. 3, to which a conventional bushing boss 86 may be welded or otherwise suitably attached. If current transformer 99 is not utilized, bushing boss 86 may be cut at the desired angle of inclination and welded directly to casing 13, thus eliminating projecting portion 84. The projecting end of bushing boss 86 has a flanged portion 88, with an annular groove 90 in the flat upper surface of flanged portion 88, in which an annular gasket member 92 is disposed.

Bridging member 82, which connects movable flange members 64 and 66, has an annular groove 94, in which an annular gasket member 96 is disposed. Bushing member 40, instead of being attached to the standard bushing boss 86, as in a conventional transformer, is suitably affixed to the bridging member 82. Bushing 40 may be a conventional high voltage electrical insulating bushing constructed of porcelain, or other suitable electrical insulating material, and contains a central opening or aperture 100 therein for receiving the high voltage electrical conductor 102. Mounting means 52 will accept conventional bushings without change or modification. Electrical insulating bushing 40 may have a metallic mounting portion or flange 104 intermediate its ends, which is suitably affixed to bridging member 82 by a plurality of bolts 106 which extend through aligned openings in flange 104 and bridging member 82 and threadably receive nuts 108. When mounting flange 104 of bushing 40 is solidly secured to bridging member 82, gasket member 96 is compressed to form a fluid tight seal between mounting flange 104 of bushing 40 and bridging member 82.

However, before bushing member 40 is inserted into casing 13 and secured to bridging member 82, fluid tight flexible coupling means or expansion joint 110 is secured in sealed relation between bridging member 82 and flange 88 of bushing boss 86. In practice, the bridging member 82 may be constructed as part of the expansion joint 110, with expansion joint 110 including flange member 82 and a flange member 112. The expansion joint 110 includes a fluid tight bellows portion 114, which may be constructed of stainless steel, or other suitable material, which allows expansion joint 110 to be moved within a predetermined distance, without damaging the bellows 114 and without affecting its fluid tight characteristics.

The flanged portion 112 of expansion joint 110 is secured to flange 88 by a plurality of bolts 120 which extend through a plurality of aligned openings in flange members 88 and 112 and threadably receive nuts 122 to firmly hold flange members 88 and 112 together. When nuts 122 are tightened, gasket member 92 is compressed, providing a fluid tight seal between flange members 88 and 112. The upper portion of expansion joint 110 is welded or otherwise secured to bridging member 82. However, as hereinbefore stated, expansion joint 110 will probably be constructed with bridging member 82 as an integral part of its assembly, with bridging member 82 then being welded or secured to movable flange members 64 and 66, and this whole assembly being secured to flange member 88, and the movable flange members 64 and 66 being pivotally secured to stationary flange members 60 and 62 by fastening means 68 and 72. Once the expansion-joint assembly 110 is in position and secured and the movable flange members 64 and 66 are pivotally associated with stationary flange members 60 and 62, bushing member 40 may be disposed in the continuous opening or conduit formed by openings 83 and 80, bushing boss 86, and flexible coupling 110, and secured to bridging member 82, as hereinbefore explained, with a portion of bushing 40 extending through the expansion joint 110 and into the casing 13 of transformer 12. Gasket members 96 and 92 tightly seal casing 13 from contaminants.

Thus, electrical insulating bushing 40 may be moved in a plane determined by the alignment of flange members 60, 62, 64 and 66. By suitable location and alignment of flange members 60, 62, 64 and 66 relative to transformer casing 13, bushing member 40 may be moved from one extreme position to another. To prevent bushing 40 from exceeding a predetermined angle or distance of travel, stopping means may be suitably disposed on the movable flange members 64 and 66, or in any other suitable location. For example, a stop 130 may be secured to movable flange member 64 which will allow bushing 40 to move in one direction until stop 130 rests against stationary flange 60. In like manner, a stop 132 may be secured to movable flange 64 which will allow bushing 40 to move in the opposite direction until stop 132 contacts stationary flange member 62. Thus, when stop 130 is resting against flange member 60, bushing 40 will be in the position shown in FIG. 3 in solid lines. When stop 132 is resting against flange member 62, bushing 40 will be in the position shown in FIG. 3 in dotted lines and marked with reference numeral 40'.

In order to secure bushing 40 in either the operative or the transporting position, fastening or securing means such as bolts (not shown) may extend through opening 142 of stationary flange member 60 and through either opening 140 or opening 141 of movable flange member 64.

As shown in FIGS. 2 and 3, bushing mounting means 52 would be in its operative position when opening 142 in flange member 60 is aligned with opening 141 in flange member 64. When opening 142 in flange member 60 is aligned with opening 140 in flange member 64, bushing 40 would be in the transporting position. FIG. 3 shows openings 141 and 142 aligned, in the view shown in solid lines, and openings 142 and 140 aligned in the view shown in the broken lines.

Figure 5:
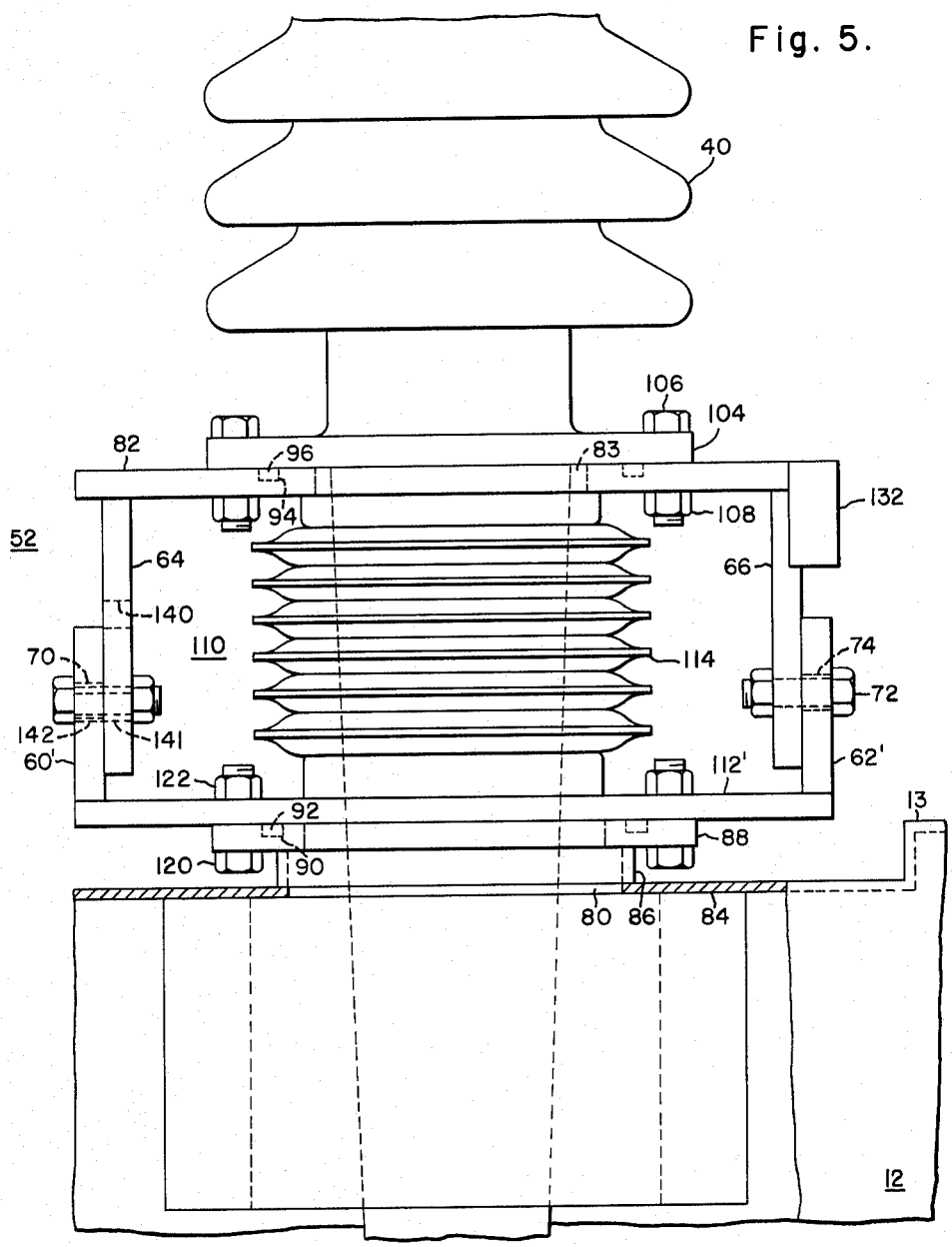
FIG. 5 shows an end view of bushing mounting means, illustrating another embodiment of the invention.

FIG. 5 illustrates an alternate embodiment of the invention, which eliminates the necessity of attaching stationary flange members 60 and 62 to the projection 84, or to the casing 13 in the event current transformer 99 is not utilized. More specifically, flange member 112 (reference numeral 112' in FIG. 5) is extended a sufficient distance to allow stationary flange members 60 and 62 to be attached directly thereto, such as by welding or other suitable means. This provides the advantage of being able to pre-assemble the complete bushing support means 52, including flange members 82 and 112, flange members 60, 62, 64 and 66, and flexible coupling 110. This facilitates final assembly of transformer 12.

In summary, a movable bushing mounting means has been disclosed which allows a standard high voltage bushing to be moved from one position to another relative to the transformer casing, without rotating the bushing and without destroying the transformer seal. Further, the use of the bushing mounting means disclosed herein, makes it possible for mobile substations to be transported with its electrical insulating bushings in a transporting position to meet highway limitations on vehicle space and height, and may be quickly and easily changed to an operating position, with a desired electrical clearance between the outer ends of the electrical insulating bushings being re-established. It will also be obvious from the disclosure that this invention may be applied to any electrical apparatus having electrical insulating bushings, and may also be used on electrical apparatus that is not considered portable during the transporting stage from factory to operating site.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A mounting assembly for mounting an electrical bushing through on opening in the casing of electrical apparatus, comprising first and second flange members secured to said casing adjacent the opening; a third flange member pivotally attached to said first flange; a fourth flange member pivotally attached to said second flange member, a plate member connecting said third and fourth flange members, said plate member having an opening therein in substantial alignment with the opening in said casing; flexible coupling means having a central opening therein; said flexible coupling means being disposed in sealed relation between said casing and said plate member, with the opening in said flexible coupling means being aligned with the openings in said casing and said plate member, forming an opening for receiving an electrical bushing; and mounting means disposed on said plate member for securing an electrical bushing in sealed relation with said plate member; said plate member being pivotally operable between at least two predetermined positions.

2. A mounting assembly for electrical insulating bushings, comprising, a casing for electrical apparatus having an opening therein; first and second spaced parallel flange members affixed to said casing with the opening in said casing being between said first and second flange members; third and fourth spaced parallel flange members pivotally secured to said first and second flange members, respectively; a connecting member having an opening therein and affixed to said third and fourth flange members; a flexible coupling member having a central opening therein; said flexible coupling member being disposed in sealed relation between said connecting member and said casing; an electrical insulating bushing; the openings in said casing, said flexible coupling member and said connecting member being in substantial alignment, with said electrical insulating bushing being disposed therethrough; said electrical insulating bushing being affixed to said connecting member and pivotally operable between at least two predetermined positions.

3. A mounting assembly for pivotally mounting an electrical bushing in an opening in the casing of electrical apparatus, comprising a flexible coupling member having an opening extending between first and second ends, the first end of said flexible coupling member being adapted for mounting on the casing of the electrical apparatus with their openings in substantial registry, the second end of said flexible coupling member being adapted to secure the electrical bushing thereto, first and second flange members disposed in spaced parallel relation and secured to the second end of said flexible coupling member, a third flange member pivotally attached to said first flange member, a fourth flange member pivotally attached to said second flange member, said third and fourth flange members being fixed relative to the first end of said flexible coupling member, allowing the second end of said flexible coupling member to pivot between at least two predetermined positions.

4. The mounting assembly of claim 3 in which the third and fourth flange members are secured to the first end of said flexible coupling member.

5. The mounting assembly of claim 3, including a casing having an opening therein, the first end of said flexible coupling member being secured to said casing, with the opening in said casing being in registry with the opening in said flexible coupling member, said third and fourth flange members being secured to said casing.

6. The mounting assembly of claim 3 including means for fixing the location of said first and second flange members at predetermined locations relative to said third and fourth flange members.

References Cited by the Examiner

UNITED STATES PATENTS 3,073,891　1/1963　Barengoltz _____ 174—161

FOREIGN PATENTS 739,023　9/1943　Germany.

LARAMIE E. ASKIN, *Primary Examiner.*